US007552149B2

(12) United States Patent
Sinha et al.

(10) Patent No.: US 7,552,149 B2
(45) Date of Patent: Jun. 23, 2009

(54) QUERYING PAST VERSIONS OF DATA IN A DISTRIBUTED DATABASE

(75) Inventors: Bipul Sinha, Foster City, CA (US); Amit Ganesh, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 443 days.

(21) Appl. No.: 10/866,333

(22) Filed: Jun. 10, 2004

(65) Prior Publication Data

US 2005/0055385 A1    Mar. 10, 2005

Related U.S. Application Data

(60) Provisional application No. 60/570,769, filed on May 12, 2004, provisional application No. 60/500,509, filed on Sep. 6, 2003, provisional application No. 60/500,510, filed on Sep. 6, 2003.

(51) Int. Cl.
*G06F 17/30* (2006.01)
(52) U.S. Cl. .............................. 707/203; 707/1; 707/3; 707/200; 707/201; 711/162
(58) Field of Classification Search .................... 707/1, 707/2, 3, 101, 102, 200–203; 711/162
See application file for complete search history.

(56) References Cited

U.S. PATENT DOCUMENTS 5,212,788 A    5/1993    Lomet et al.
5,280,612 A    1/1994    Lorie et al.
5,317,731 A    5/1994    Dias et al.
5,333,316 A    7/1994    Champagne et al.
5,347,653 A    9/1994    Flynn et al.
5,440,730 A *  8/1995    Elmasri et al. ............... 707/203
5,447,164 A *  9/1995    Shaya et al. ................. 600/523
5,452,445 A    9/1995    Hallmark et al.
5,613,113 A    3/1997    Goldring
5,638,508 A    6/1997    Kanai et al.

(Continued)

FOREIGN PATENT DOCUMENTS

FR    2 746 526 A1    9/1997

OTHER PUBLICATIONS

Chandrasekaran, Sirish, "PSoup: a system for streaming queries over streaming data" (2003) vol. 12, Issue 2, pp. 140-156.

(Continued)

*Primary Examiner*—Pierre M Vital
*Assistant Examiner*—Christopher J Raab
(74) *Attorney, Agent, or Firm*—Hickman Palermo Truong & Becker LLP

(57) ABSTRACT

Past versions of data in a distributed database system comprising multiple databases and associated database servers are queried using temporal database access mechanisms, where a request for data in a past state from a "remote" database can be received at a "local" database server and relevant portions of the request are passed to the remote server for processing. The processing performed by the remote server includes returning the requested data in the specified past state to the local server, or at least with enough information to reconstruct the data into the past state.

33 Claims, 3 Drawing Sheets

U.S. PATENT DOCUMENTS

| | | | |
|---|---|---|---|
| 5,701,480 A | 12/1997 | Raz | |
| 5,857,204 A | 1/1999 | Lordi et al. | |
| 5,870,758 A | 2/1999 | Bamford et al. | |
| 5,873,102 A | 2/1999 | Bridge, Jr. et al. | |
| 5,890,167 A | 3/1999 | Bridge, Jr. et al. | |
| 5,907,848 A | 5/1999 | Zaiken et al. | |
| 5,930,794 A | 7/1999 | Linenbach et al. | |
| 5,956,731 A | 9/1999 | Bamford et al. | |
| 5,974,427 A | 10/1999 | Reiter | |
| 5,999,924 A * | 12/1999 | Bair et al. | 707/4 |
| 6,003,024 A * | 12/1999 | Bair et al. | 707/3 |
| 6,012,059 A | 1/2000 | Neimat et al. | |
| 6,012,060 A | 1/2000 | Loaiza et al. | |
| 6,014,674 A | 1/2000 | McCargar | |
| 6,018,746 A | 1/2000 | Hill et al. | |
| 6,029,160 A | 2/2000 | Cabrera et al. | |
| 6,067,550 A | 5/2000 | Lomet | |
| 6,138,121 A | 10/2000 | Costa et al. | |
| 6,173,292 B1 | 1/2001 | Barber et al. | |
| 6,182,241 B1 | 1/2001 | Ngai et al. | |
| 6,192,377 B1 | 2/2001 | Ganesh et al. | |
| 6,192,378 B1 | 2/2001 | Abrams et al. | |
| 6,233,573 B1 * | 5/2001 | Bair et al. | 707/3 |
| 6,237,001 B1 | 5/2001 | Bamford et al. | |
| 6,243,702 B1 | 6/2001 | Bamford et al. | |
| 6,263,338 B1 | 7/2001 | Ronström et al. | |
| 6,321,324 B1 | 11/2001 | Debrunner et al. | |
| 6,345,268 B1 * | 2/2002 | de la Huerga | 707/3 |
| 6,449,624 B1 | 9/2002 | Hammack et al. | |
| 6,480,847 B1 | 11/2002 | Linenbach et al. | |
| 6,502,133 B1 | 12/2002 | Baulier et al. | |
| 6,505,228 B1 | 1/2003 | Schoening et al. | |
| 6,567,928 B1 | 5/2003 | Lyle et al. | |
| 6,609,123 B1 | 8/2003 | Cazemier et al. | |
| 6,618,822 B1 | 9/2003 | Loaiza et al. | |
| 6,631,374 B1 | 10/2003 | Klein et al. | |
| 6,636,851 B1 | 10/2003 | Bamford et al. | |
| 6,647,473 B1 | 11/2003 | Golds et al. | 711/161 |
| 6,647,510 B1 | 11/2003 | Ganesh et al. | |
| 6,681,230 B1 | 1/2004 | Blott et al. | |
| 6,714,943 B1 | 3/2004 | Ganesh et al. | |
| 6,735,605 B2 | 5/2004 | Bird et al. | |
| 6,738,975 B1 | 5/2004 | Yee et al. | |
| 6,769,074 B2 | 7/2004 | Vaitzblit | |
| 6,769,124 B1 | 7/2004 | Schoening et al. | |
| 7,237,075 B2 * | 6/2007 | Welsh et al. | 711/162 |
| 7,274,783 B2 * | 9/2007 | Yoakum et al. | 379/219 |
| 2002/0116457 A1 | 8/2002 | Eshleman et al. | 709/203 |
| 2005/0055385 A1 | 3/2005 | Sinha et al. | 707/203 |
| 2005/0055603 A1 | 3/2005 | Soran et al. | 714/7 |
| 2005/0144199 A2 | 6/2005 | Hayden | |
| 2005/0256897 A1 | 11/2005 | Sinha et al. | |
| 2005/0278350 A1 | 12/2005 | Yang et al. | |

OTHER PUBLICATIONS

Djafri, Nassima et al., "Spatio-temporal evolution: querying patterns of change in databases" (2002) ACM Press, pp. 35-41.

Sandra Cheevers, Oracle Corporation, "Oracle9i Database Summary," An Oracle White Paper, May 2002, pp. 1-35.

Ron Weiss, Oracle Corporation, "Oracle 9i Availability and Manageability Technology," Feb. 13, 2001, pp. 1-39.

Ron Weiss, Oracle Corporation, "Oracle High Availability Architectural Overview," Feb. 12, 2001, pp. 1-37.

Oracle Corporation, "Oracle9i Flashback Query," Oracle9i Database, Daily Feature, Apr. 18, 2002, pp. 1-2.

Oracle Corporation, "Flashback Technology," 2004, pp. 1-5.

Chiang Lee et al, "Temporal Grid File: A File Structure for Interval Data," Data & Knowledge Engineering, vol. 26, No. 1, May 1998, XP-001004414, pp. 71-97.

Toshiyuki Amagasa et al, "Implementing Time-Interval Class for Managing Temporal Data," International Workshop on Database and Expert Systems Applications, Aug. 26, 2003, XP-002167975, 7 pages.

* cited by examiner

QUERYING PAST VERSIONS OF DATA IN A DISTRIBUTED DATABASE

CROSS REFERENCE TO RELATED APPLICATIONS

This application claims the benefit of priority from U.S. Provisional Patent Application No. 60/570,769 filed May 12, 2004, entitled "Querying Past Versions of Data in a Distributed Database"; is related to U.S. Pat. No. 6,631,374 issued Oct. 7, 2003, entitled "System and method for providing fine-grained temporal database access"; is related to U.S. patent application Ser. No. 10/364,209 filed Feb. 10, 2003, entitled "Method And Mechanism For Identifying Last Transaction On A Row of Data"; is related to U.S. patent application Ser. No. 10/364,065 filed Feb. 10, 2003, entitled "Method And Mechanism For Rolling Back A Transaction On A Row of Data"; is related to U.S. patent application Ser. No. 10/325,211 filed Dec. 18, 2002, entitled "Method And Apparatus For Accessing Data As It Existed At A Previous Point In Time"; is related to U.S. Provisional Patent Application No. 60/500,509 filed Sep. 6, 2003, entitled "System, Structure, Interface, and Semantics For Implementing Row Versions: Accessing Past Versions Of A Data Item"; is related to U.S. Provisional Patent Application No. 60/500,510 filed Sep. 6, 2003, entitled "Method and Mechanism For Row Versioning"; the contents of all of which are incorporated by this reference in their entirety for all purposes as if fully set forth herein.

FIELD OF THE INVENTION

The present invention relates generally to database systems and, more specifically, to techniques for querying past versions of data from a remote database in a distributed database system.

BACKGROUND OF THE INVENTION

Temporal database access provides the capability to access data from a database, that reflects the state of the data at any given time in the life of the data. Temporal database access can support recovery at all levels, including the row, transaction, table, tablespace, and database wide levels, and is often used to correct human errors by reconstructing data as the data was in the past.

Temporal database access technology has evolved over the years. In an early incarnation, temporal access is enabled for a user session, through which a user can "see" the entire database at a particular point in time in the past (referred to as a "flashback query"). Hence, a user can access the state of all the data in a database at any specified point in time. This technology allows a user to query data as it was in the past, without having to persistently rollback changes that were made to the data from the time in the past up to the time of the query (which can take hours or days to complete). Thus, this incarnation allows for a speedy method for point-in-time recovery, like having a rewind button for the database.

Unlike conventional queries, flashback queries specify a flashback time, and return data as it existed at the specified flashback time. One technique for handling flashback queries is described in U.S. Pat. No. 6,631,374 entitled "System And Method For Providing Fine-Grained Temporal Database Access" by Jonathan D. Klein, et al., the contents of which is incorporated by this reference in its entirety for all purposes as if fully set forth herein.

In another incarnation, temporal access enables a user to query particular data at multiple particular points in time in the past. For example, a user can query and manipulate data from a table T1 at a time t1, data from a table T2 at a time t2, data from a table T3 at present time, and so on, while maintaining referential integrity constraints among the tables. Thus, the granularity of the temporal access evolved from entire database access at a particular time in the past, to particular table access at particular points in time in the past, like having a rewind button for each of the tables in the database.

One technique for identifying one or more transactions that have modified or created an object, such as a row of data, in a database system is described in U.S. patent application Ser. No. 10/364,209 filed by Ken Jacobs, et al. on Feb. 10, 2003, entitled "Method And Mechanism For Identifying Last Transaction On A Row of Data"; which incorporates by reference U.S. patent application Ser. No. 09/748,408 filed by Amit Ganesh, et al. on Dec. 22, 2000 and issued as U.S. Pat. No. 6,647,510, entitled "Method and Apparatus for Making Available Data that was Locked by a Dead Transaction before Rolling Back the Entire Dead Transaction"; the contents of all of which are incorporated by this reference in their entirety for all purposes as if fully set forth herein.

One technique for undoing, reversing, or compensating for a committed transaction in a database system is described in U.S. patent application Ser. No. 10/364,065 filed by Amit Ganesh, et al. on Feb. 10, 2003, entitled "Method And Mechanism For Rolling Back A Transaction On A Row of Data", the contents of which is incorporated by this reference in its entirety for all purposes as if fully set forth herein.

A related technique, for handling a "flashback cursor" that is created in response to receipt of a "flashback query" and that is a particular type of cursor that is used to access past data is described in U.S. patent application Ser. No. 10/325,211 filed by Bipul Sinha, et al. on Dec. 18, 2002, entitled "Method And Apparatus For Accessing Data As It Existed At A Previous Point In Time", the contents of which is incorporated by this reference in its entirety for all purposes as if fully set forth herein.

In another incarnation, temporal access enables a user to query particular data over a range of time, rather than at a point in time. A user can query and manipulate multiple versions of data at the row level. Hence, the reach of the temporal access evolved from accessing the state of data at a point in time to the progression of data over a span of time. For example, in response to a "version" query, transaction metadata is returned for transactions that occurred on the specified data over the specified range of time, such as metadata that identifies what transactions were committed and when. Using this technology, one can pinpoint when and how data is changed and trace it back to the user, application, or transaction that changed the data.

Available techniques for implementing row versioning, which enables accessing and manipulating multiple versions of a row of a database table, including one or more past versions, are described in U.S. Provisional Patent Application No. 60/500,509, entitled "System, Structure, Interface, and Semantics For Implementing Row Versions: Accessing Past Versions Of A Data Item" and U.S. Provisional Patent Application No. 60/500,510, entitled "Method and Mechanism For Row Versioning".

The current state of temporal database access is extended to provide fast and easy recovery at the database, table, row, and transaction level, and by just operating on the changed data. Therefore, data can be queried as it existed in the past, current data can be compared to past data, and deleted or changed data can be recovered. The time it takes to recover from an error is now equal to the amount of time it took to make the error. However, even in light of the existing capabilities regarding temporal access to data in a database, and the benefits provided thereby, there is room for improvement in methods for temporal access to data.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION OF EMBODIMENTS OF THE INVENTION

In the following description, for the purposes of explanation, numerous specific details are set forth in order to provide a thorough understanding of embodiments of the present invention. It will be apparent, however, that embodiments of the present invention may be practiced without these specific details. In other instances, well-known structures and devices are shown in block diagram form in order to avoid unnecessarily obscuring embodiments of the present invention.

Functional Overview of Embodiments

Techniques are provided for querying past versions of data in a distributed database system that has multiple databases and associated database servers. Using temporal database access mechanisms, a request for data, in a past state, from a "remote" database, can be received at a "local" database server. Relevant portions of the request are passed to the remote server, where the relevant portions are processed. The processing performed by the remote server includes returning the requested data in the specified past state to the local server, or at least returning enough information to reconstruct the data into the past state. In this context, "local" simply refers to the database server that receives the request, e.g., a database query, from a user; and "remote" simply refers to another database and/or server that is associated with the local server via a conventional distributed database link.

A request for a past version of data includes a time-specifying parameter to specify the past version of the data, which may include a timestamp, a system change number that is used to track the sequence in which events occur within a database server, and the like. Furthermore, the time-specifying parameter may include a time interval with which the data is associated in the remote database, where multiple versions of the data are returned, or at least enough information to reconstruct the data into the past versions, each of which is associated with a time that falls within the time interval.

Examples of the breadth of applicability of these techniques include application (1) to a distributed database system comprising many databases, (2) to database query operations on the past version of the data, (3) to database query operations on the past version of the data and a current version of the same or other data, from the same or another database, and (4) to database query operations on the past version of the data and the same or other data in a different past state, from the same or another database.

Operating Environment

Figure 1:
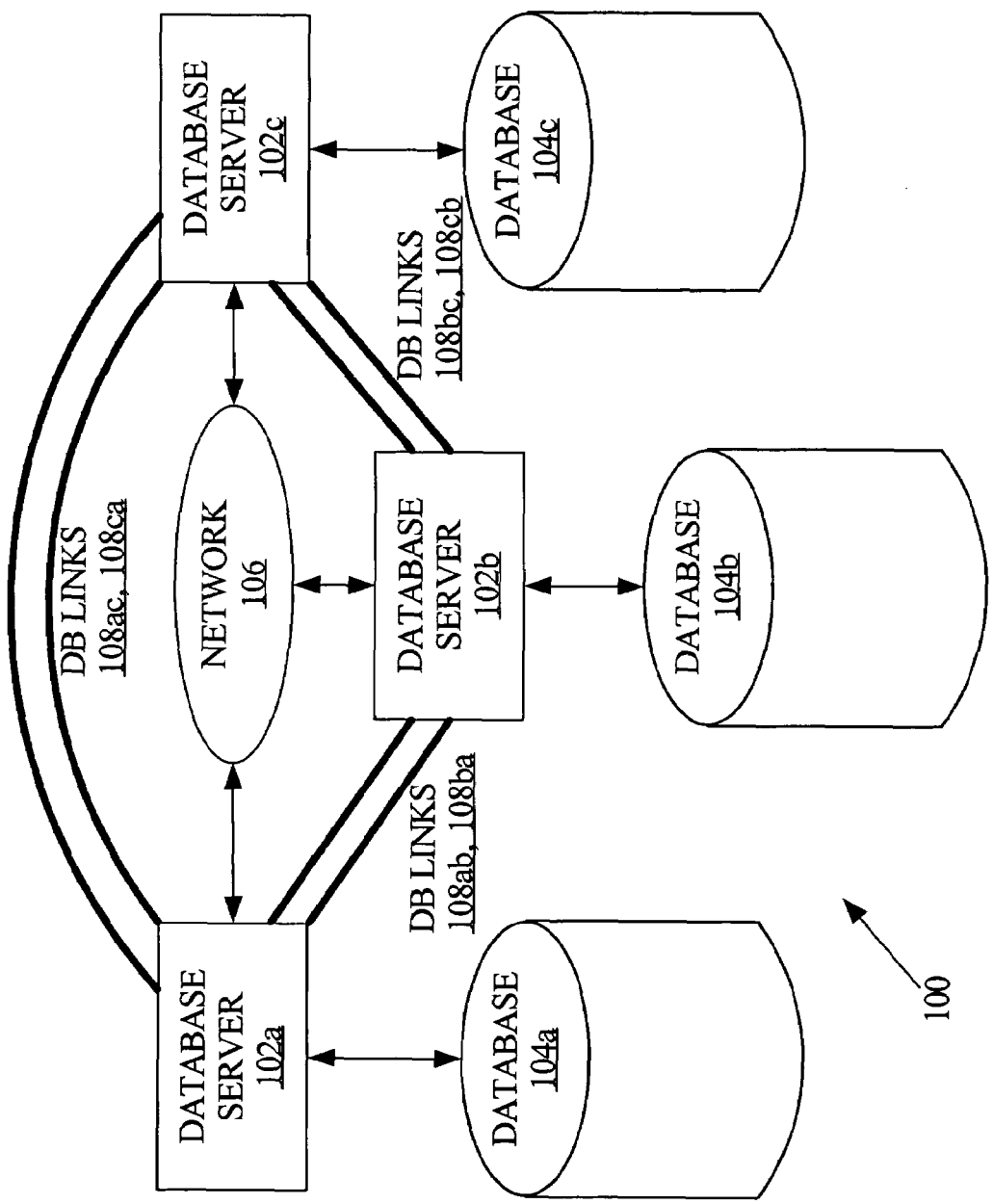
FIG. 1 is a block diagram that illustrates an operating environment in which an embodiment of the invention may be implemented.

FIG. 1 is a block diagram that illustrates an operating environment in which an embodiment of the invention may be implemented. The operating environment of FIG. 1 is referred to herein as a distributed database system (or, simply, a distributed database). Generally, a distributed database comprises a set of databases, each stored on different storage mechanisms, that appears to applications as a single database. Consequently, an application can simultaneously access and modify the data in several databases in a network. Each database in the system is controlled by its local database management server (DBMS) but cooperates to maintain the consistency of the global distributed database.

Figure 3:
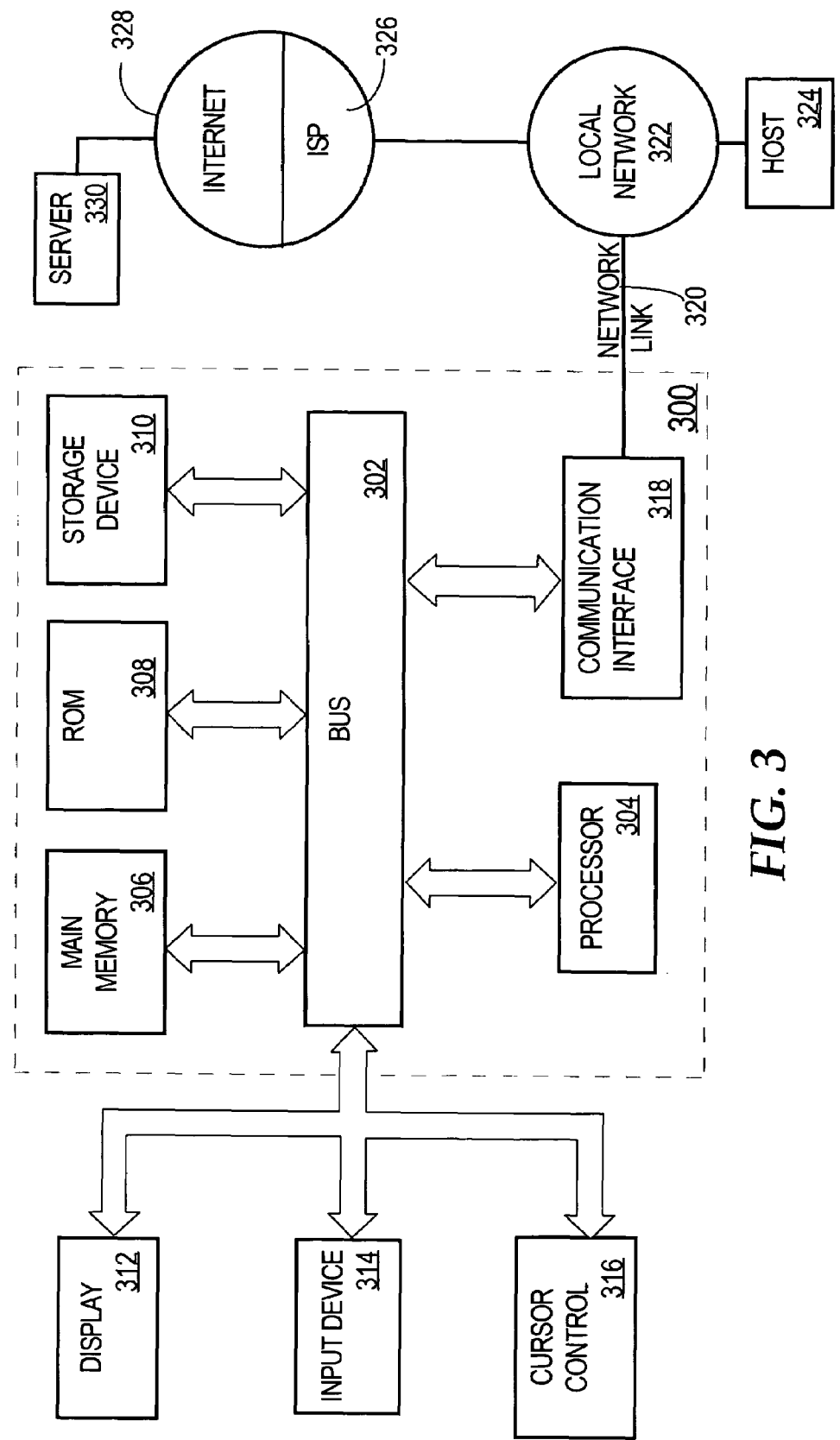
FIG. 3 is a block diagram that illustrates a computer system upon which an embodiment of the invention may be implemented.

Distributed database 100 is illustrated as having three interconnected databases; however, a distributed database can generally comprise any number of interconnected databases. Thus, FIG. 3 depicts three databases simply for purposes of example and explanation. Distributed database 100 comprises a number of database servers ("server") 102a, 102b, 102c that are each communicatively connected to respective databases 104a, 104b, 104c. The servers 102a, 102b, 102c are communicatively connected to each other via one or more network 106, such as a conventional LAN (Local Area Network), a WAN (Wide Area Network) such as the Internet, or both. Through the network 106 connections, the servers can exchange database statements such as standard SQL queries or portions thereof, and/or portions of a query execution plan.

A database server 102a, 102b, 102c is a combination of integrated software components and an allocation of computational resources (such as memory and processes) for executing the integrated software components on a processor, where the combination of the software and computational resources are used to manage a particular database, such as database 104a, 104b, 104c. Among other functions of database management, a database server typically governs and facilitates access to a database by processing requests from clients to access the database.

Although not depicted in FIG. 1, each database server 102a, 102b, 102c within distributed database 100 is communicatively connected to one or more client applications via one or more networks, such as a conventional LAN or WAN. The network(s) that connects client applications to the database servers may or may not be the same as network 106, which interconnects the database servers. Client applications are typically software programs that request and possibly manipulate data, via a database server 102a, 102b, 102c, that is stored in one or more of databases 104a, 104b, 104c. Non-limiting examples of client applications include a web browser executing on a desktop computer and a more programmatically complex application program executing on an application server or other mid-tier component.

Each server 102a, 102b, 102c executes on a computer such as computer system 300 of FIG. 3. A server in a distributed database system can act as a client, a server, or both. For example, the server 102a used to manage database 104a is acting as a server when a statement is issued against its local data in database 104a, and is acting as a client when it issues a statement against remote data in database 104b.

Each database 104a, 104c, 104c is a repository for data and metadata that is stored on a persistent memory mechanism, such as a set of hard disks. Such data and metadata may be stored in each database logically, for example, according to relational database constructs, multidimensional database constructs, or a combination of relational and multidimensional database constructs.

Each database 104a, 104c, 104c in a distributed database 100 is distinct from all other databases in the system. Each database of a distributed database typically stores different data than the other databases in the system, i.e., the different databases are not simply back-ups of another database. For example, each database 104a, 104b, 104c may store data for a particular organizational group or function (e.g., Human Resources, Finance, Sales, Manufacturing) or may store data for different organizational regions or countries (e.g., Americas, Asia, Europe). Furthermore, each database has its own global database name which may, for example, be prefixed with an associated network domain name.

To facilitate client requests in distributed database 100, servers 102a, 102b, 102c are logically interconnected through database links. A database link defines a one-way communication path from a database system (e.g., a database server and a database) to another database system. For example, server 102a is associated with a database link 108ab that points to server 102b and, similarly, server 102b is associated with a database link 108ba that points to server 102a. Similarly, servers 102b and 102c have associated database links 108bc, 108cb; and servers 102a and 102c have associated database links 108ac, 108ca. Database links are typically implemented to operate transparently to users, for example, by naming the database links the same as the global name of the database to which the link points.

Once a database link is created, client applications connected to a local database can access data in a remote database via the associated database link. A database link may be a private database link in a specific schema of a local database, with which only the owner of the private database link or subprograms in the schema can use the private database link to access data and database objects in the corresponding remote database. A database link may be a public database link, with which all users and subprograms in the local database can use the public database link to access data and database objects in the corresponding remote database.

A distributed database typically supports (1) remote queries, updates, and transactions which select or update information from one or more remote tables, all of which reside at the same remote node; (2) distributed queries, updates, and transactions, which select or update information from two or more nodes, each of which may be a local or a remote node. Client applications of a distributed database can make local procedure calls to perform work at a local database and remote procedure calls to perform work at a remote database, through which the local server passes all procedure parameters in the call to the remote server.

Location transparency within a distributed database exists when a user can universally refer to a database object, such as a table, regardless of the node to which an application connects. Synonyms can be used to establish location transparency for the tables and supporting objects in an application schema, where synonyms are created in a local database for tables in a remote database. Consequently, rather than accessing a remote table using its actual database link path to the table, the remote table can be accessed using a much simpler query, using the synonym, that does not have to account for the table location. Through use of location transparency, query, update and transaction transparency is also provided by a distributed database such as distributed database 100.

Processing Requests for Past Versions of Data in a Distributed Database

Figure 2:
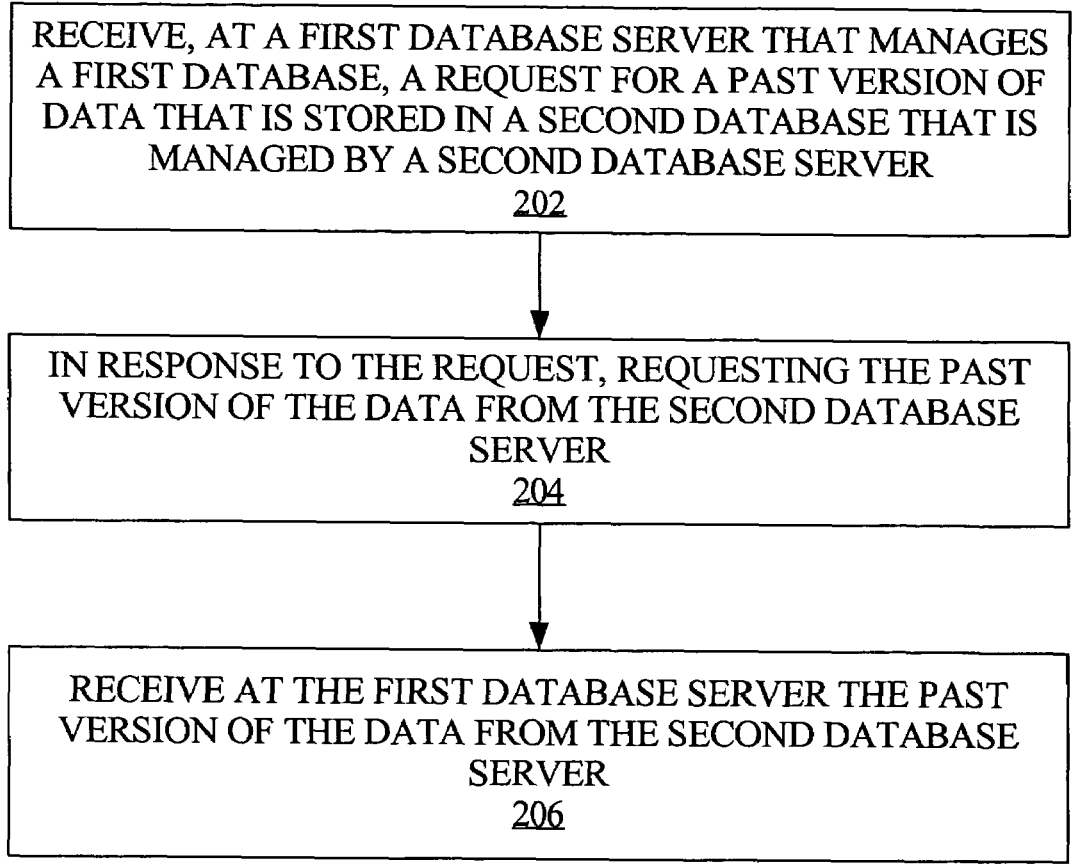
FIG. 2 is a flow diagram that illustrates a method for managing requests for data, according to an embodiment of the invention.

FIG. 2 is a flow diagram that illustrates a method for managing requests for data, according to an embodiment of the invention. In the context of a database, the illustrated method is performed by, for example, a database management server such as any of servers 102a, 102b, 102c.

At block 202, a request is received at a first database server that manages a first database, where the request is for a past version of data that is stored in a second database that is managed by a second database server. The data is stored in a current state in the second database. The requested data is not also stored in the first database, such as in a redundant database architecture. However, the second database also stores enough information, such as metadata and transaction log files (e.g., undo and redo files), to reconstruct the past version of the data. For example, a request is received at database server 102a, via a network, from a user working at a web browser, where the request is for a past version of data that is stored in database 104b.

The database server that receives the original request from the client is referred to herein as the "local" server and the database managed by the local server is referred to herein as the "local" database; whereas any of the other database servers and databases in the distributed database system other than the local server and database are referred to herein as a "remote" server and a "remote" database, respectively.

The past version of data that is requested at block 202 is specified, in one embodiment, by a time-specifying parameter within the request. In one implementation, the time-specifying parameter may specify a particular time that can be compared to a timestamp that is associated with the requested past version of data, and in another implementation, the time-specifying parameter may be a system change number (SCN) associated with a transaction on the requested data. In either case, the request specifies a point in time that can be used by the remote server to identify the past version of the data. The remote database in which the requested data is stored is specified in the request, by specifying the requested data in association with the relevant database link, or by specifying the requested data in conjunction with a synonym for the table that contains the data at the database link.

In one embodiment, the request received at block 202 specifies a time interval with which the data is associated in the second database. If there were multiple versions of the data during that time interval, then the request is for each of the multiple versions. What data is returned in response to this type of request is described in reference to block 206.

With use of various techniques that are described in the related and otherwise herein-referenced patents and patent applications, a multiplicity of data request types can be made. For non-limiting examples, in conjunction with a request for a past version of data stored in a remote database, a query can be submitted to a database server that includes (1) a request for a current version of the same data represented in the requested past version, from the same remote database; (2) a request for a past version of different data from the same remote database; (3) a request for a past version of different data from a different database in the distributed database system, whether it be the local database or a different remote database; (4) a request for a current version of different data from a different database in the distributed database system, whether it be the local database or a different remote database; (5) a request for multiple past versions of the same data, at different points or intervals in time, from the same remote database; (6) a request for multiple past versions of different data, at the same or different points or intervals in time, from other database(s) in the distributed database system, whether it be from the local database or different remote databases; and the like.

Furthermore, the request received at block 202 may also specify a database operation to perform on the past data, such as a join of (a) a table that contains the past version of the data, with (b) a table that contains a past or current version of the same or other data; or may specify a past version of data in a subquery clause of a DML (data manipulation language) operation or DDL (data definition language) operation.

At block 204, the past version of the data is requested from the second database server, in response to the request received at block 202. For example, local database server 102a passes a portion of the query, or a portion of the query execution plan, to remote database server 102b for retrieval of the requested past version of data from database 104b.

For example, in generation of a query execution plan by a query optimizer program at the local server 102a, the optimizer recognizes that the query contains a request for data from a linked remote database 104b, and causes at least a portion of the query or query plan which is relevant to the requested data to be passed to the remote server 102b, where the portion is executed. Local server 102a passes the portion to server 102b via the network 106. One technique for passing information that specifies the requested point or interval in time to the remote server 102b is to pass the information to an API associated with the remote server, where the API allows the passing of and is able to handle such information. One other technique for passing such information to the remote server 102b is to pass the information using a remote procedure call to a procedure that executes on the remote server. Use of the technique described is not limited to any particular approach to passing the time-specifying information from the local server to the remote server.

At block 206, the past version of the data is received at the first (i.e., local) database server from the second (i.e., remote) database server. Execution of the portion of the query or plan that was passed to the remote server at block 204, which is performed at the remote server, may vary from implementation to implementation. For example, what is performed at the remote server may entail simply accessing and returning to the local server the data and relevant metadata that can be used to reconstruct the past version of the data, or actually reconstructing the past version of the data. Hence, the past version of the data that is received at the local server at block 206 may comprise the data and relevant metadata that can be used to reconstruct the past version of the data by the local server, or a complete reconstructed past version of the data.

The technique described allows a user to see the data in the past state without persistently transforming the data. Furthermore, a user can simply request the past version of data using a query represented in a conventional query language, such as SQL, without requiring the expertise of a database administrator.

With the embodiment in which the request for a past version of data specifies a time interval with which the data is associated in the second database, block 206 comprises receiving multiple versions of the data, each of which is associated with a time that falls within the specified time interval. For example, what is received at the local server may be a past version and a current version of the data if the specified time interval ends with a current time (e.g., a time after which no transactions have committed changes on the requested data), or may be multiple past versions that are associated with respective database transactions that were committed on the requested data during the specified time interval.

In one related embodiment, at block 206, transaction metadata is received at the local server from the remote server, where the transaction metadata includes information that describes what database transactions were committed on the data during the specified time interval and when the transactions committed, which can be used to reconstruct the various versions of the data that existed at times within the time interval. This allows a user to see the progression of the data over the time interval.

In summary, the method described in reference to FIG. 2 provides for querying, from a local server in a distributed database system, past versions of data from a remote server in the distributed database system, using temporal database access mechanisms.

Hardware Overview

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk, optical disk, or magneto-optical disk, is provided and coupled to bus 302 for storing information and instructions.

Computer system 300 may be coupled via bus 302 to a display 312, such as a cathode ray tube (CRT) or a liquid crystal display (LCD), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical, magnetic, or magneto-optical disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

Extensions and Alternatives

Alternative embodiments of the invention are described throughout the foregoing description, and in locations that best facilitate understanding the context of the embodiments. Furthermore, the invention has been described with reference to specific embodiments thereof. It will, however, be evident that various modifications and changes may be made thereto without departing from the broader spirit and scope of the invention. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A method for querying past versions of data in a distributed database comprising at least a first database and a second database logically connected via database links and appearing to client applications as a single database, the method comprising the computer-implemented steps of:

receiving, at a first database server that manages data in a first database, a request for a past version of data stored in a second database that is managed by a second database server;

wherein the request indicates one or more conditions and a time specifying parameter;

wherein said time-specifying parameter corresponds to one or more prior logical states of the second database;

wherein the request for the past version of data stored in the second database is a request for data that, as the data existed in said one or more prior logical states of the second database, satisfied said one or more conditions, without regard to whether the data, as the data exists in a current state of the second database, satisfies the one or more conditions;

in response to said request, said first database server requesting said past version of said data from said second database server; and receiving at said first database server a representation of said past version of said data, as said data existed in said second database at a prior point in time that corresponds to the time specifying parameter, from said second database server;

wherein the step of requesting said past version comprises passing to said second database server one of:

(a) a particular time that can be compared to a timestamp that is associated with said data to identify said past version of said data by said second database server; or (b) a particular system change number that is associated with said data and is used to identify said past version of said data by said second database server, wherein a system change number is a logical time value indicating the sequence in which events occur within the second database server.

2. The method of claim 1, wherein the step of passing comprises passing to said second database server a particular time that can be compared to a timestamp that is associated with said data to identify said past version of said data by said second database server.

3. The method of claim 1, wherein the step of passing comprises passing to the second database server a particular system change number that is associated with said data and is used to identify said past version of said data by said second database server, wherein a system change number is a logical time value indicating the sequence in which events occur within the second database server.

4. The method of claim 1, wherein said data is stored only in said second database and not in said first database.

5. The method of claim 1, wherein the step of receiving a request comprises receiving a request that specifies a time interval that can be associated with said data in said second database.

6. The method of claim 5, wherein the step of receiving said past version of said data comprises receiving multiple versions of said data, each of which is associated with a time that falls within said time interval.

7. The method of claim 6, wherein the step of receiving said multiple past versions of said data comprises receiving transaction metadata associated with each past version.

8. The method of claim 1, wherein the step of receiving a request comprises receiving a request that specifies a database operation on said past version of said data that is stored in said second database, the method further comprising the computer-implemented step of:
performing said operation on said past version of said data.

9. The method of claim 1, wherein the step of receiving a request comprises receiving a request that specifies a database operation on said past version of said data that is stored in said second database and a current version of data, the method further comprising the computer-implemented step of:
performing said operation on said past version of said data and said current version of data.

10. The method of claim 9, wherein said past version and said current version are different versions of the same data from said second database.

11. The method of claim 9, wherein said current version of data is from said first database.

12. The method of claim 1, wherein the step of receiving a request comprises receiving a request that specifies a database operation on said past version of said data stored in said second database and a past version of data that is stored in said first database, the method further comprising the computer-implemented step of:
performing said operation on said past version of said data stored in said second database and said past version of said data that is stored in said first database.

13. The method of claim 12, wherein said past version of said data stored in said second database is associated with a first time and said past version of said data that is stored in said first database is associated with a second time, and wherein said first time is different than said second time.

14. The method of claim 1, further comprising the computer-implemented steps of:
wherein the step of receiving a request comprises receiving a request for a past version of first data, wherein said first data is stored in a first remote database that is associated with said first database via a database link, and a past version of second data, wherein said second data is stored in a second remote database that is associated with said first database via a database link; and
wherein the step of receiving data comprises receiving at said first database server said past version of said first data and said past version of said second data.

15. The method of claim 14, wherein said past version of said first data is associated with a first time and said past version of said second data is associated with a second time, and wherein said first time is different than said second time.

16. The method of claim 1, further comprising the computer-implemented step of:
retrieving said past version of said data from said second database without changing said data in persistent storage.

17. A computer-readable storage medium carrying one or more sequences of instructions which, when executed by one or more processors, causes the one or more processors to perform the method recited in claim 1.

18. A computer-readable storage medium carrying one or more sequences of instructions which, when executed by one or more processors, causes the one or more processors to perform the method recited in claim 2.

19. A computer-readable storage medium carrying one or more sequences of instructions which, when executed by one or more processors, causes the one or more processors to perform the method recited in claim 3.

20. A computer-readable storage medium carrying one or more sequences of instructions which, when executed by one or more processors, causes the one or more processors to perform the method recited in claim 4.

21. A computer-readable storage medium carrying one or more sequences of instructions which, when executed by one or more processors, causes the one or more processors to perform the method recited in claim 5.

22. A computer-readable storage medium carrying one or more sequences of instructions which, when executed by one or more processors, causes the one or more processors to perform the method recited in claim 6.

23. A computer-readable storage medium carrying one or more sequences of instructions which, when executed by one or more processors, causes the one or more processors to perform the method recited in claim 7.

24. A computer-readable storage medium carrying one or more sequences of instructions which, when executed by one or more processors, causes the one or more processors to perform the method recited in claim 8.

25. A computer-readable storage medium carrying one or more sequences of instructions which, when executed by one or more processors, causes the one or more processors to perform the method recited in claim 9.

26. A computer-readable storage medium carrying one or more sequences of instructions which, when executed by one or more processors, causes the one or more processors to perform the method recited in claim 10.

27. A computer-readable storage medium carrying one or more sequences of instructions which, when executed by one or more processors, causes the one or more processors to perform the method recited in claim 11.

28. A computer-readable storage medium carrying one or more sequences of instructions which, when executed by one or more processors, causes the one or more processors to perform the method recited in claim 12.

29. A computer-readable storage medium carrying one or more sequences of instructions which, when executed by one or more processors, causes the one or more processors to perform the method recited in claim 13.

30. A computer-readable storage medium carrying one or more sequences of instructions which, when executed by one or more processors, causes the one or more processors to perform the method recited in claim 14.

31. A computer-readable storage medium carrying one or more sequences of instructions which, when executed by one or more processors, causes the one or more processors to perform the method recited in claim 15.

32. A computer-readable storage medium carrying one or more sequences of instructions which, when executed by one or more processors, causes the one or more processors to perform the method recited in claim 16.

33. A system comprising:

means for receiving, at a first database server that manages data in a first database, a request for a past version of data stored in a second database that is managed by a second database server, wherein said first database and said second database are components of a distributed database and are logically connected via database links and appear to client applications as a single database;

wherein the request indicates one or more conditions and a time-specifying parameter;

wherein said time-specifying parameter corresponds to one or more prior logical states of the second database;

wherein the request for the past version of data stored in the second database is a request for data that, as the data existed in said one or more prior logical states of the second database, satisfied said one or more conditions, without regard to whether the data, as the data exists in a current state of the second database, satisfies the one or more conditions;

means for said first database server requesting said past version of said data from said second database server in response to said request; and means for receiving at said first database server a representation of said past version of said data, as said data existed in said second database at a prior point in time that corresponds to the time specifying parameter, from said second database server;

wherein the step of requesting said past version comprises passing to said second database server one of:

(a) a particular time that can be compared to a timestamp that is associated with said data to identify said past version of said data by said second database server; or (b) a particular system change number that is associated with said data and is used to identify said past version of said data by said second database server, wherein a system change number is a logical time value indicating the sequence in which events occur within the second database server.

* * * * *